United States Patent Office

Re. 27,576
Reissued Feb. 6, 1973

27,576
WATER-INSOLUBLE BENZIMIDAZOLONE CONTAINING MONOAZO DYESTUFFS

Joachim Ribka, Offenbach am Main, Germany, assignor to Farbwerke Hoechst Aktiengesellschaft vormals Meister Lucius & Bruning, Frankfurt am Main, Germany No Drawing. Original No. 3,555,003, dated Jan. 12, 1971, Ser. No. 769,728, Oct. 22, 1968. Application for reissue Mar. 23, 1971, Ser. No. 127,389
Claims priority, application Germany, Oct. 27, 1967, P 16 44 231.2; Aug. 2, 1968, P 17 95 051.5
Int. Cl. C09b *29/36*
U.S. Cl. 260—157 7 Claims

Matter enclosed in heavy brackets [ ] appears in the original patent but forms no part of this reissue specification; matter printed in italics indicates the additions made by reissue.

ABSTRACT OF THE DISCLOSURE

Water-insoluble monoazo dyestuffs consisting of 5-amino-isophthalic-acid-dimethylester as diazo component and 5 - acetoacetylamino - benzimidazolones as coupling component and process for their preparation. Said pigments are especially suitable for dyeing and printing plastics, caoutchouc, resins of natural or synthetic origin, fibrous textile materials or paper. Moreover, the pigments can be used for the preparation of dispersion paints, lacquers and printing inks.

The present invention relates to new, and valuable, water-insoluble monoazo dyestuffs that correspond to the formula

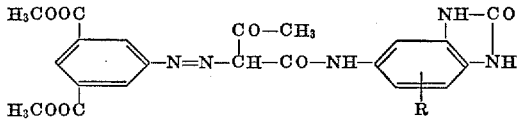

wherein R represents a hydrogen or halogen atom, such as chlorine or bromine, a methyl, methoxy or ethoxy group and to a process for their preparation which comprises diazotizing 5-aminoisophthalic dimethyl ester and coupling it with 5-acetoacetyl-benzimidazolones of the general formula

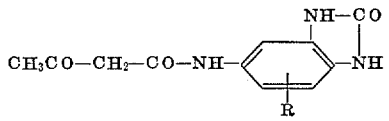

wherein R is defined as above

The diazo component may be produced by known methods, for example by esterification of 5-nitroisophthalic acid with methanol and subsequent reduction. The coupling components are advantageously prepared by reacting the corresponding aminobenzimidazolones with diketone either in water or an organic solvent, for example glacial acetic acid. The coupling reaction may proceed in known manner, especially in an aqueous medium, advantageously in the presence of a non-ionic, anionic or cationic dispersing agent. In order to obtain pigments of more appropriate grain structure the coupling mixture is usefully heated for some time, for example to the boil or maintained under pressure at temperatures above 100° C., if desired, in the presence of an organic segment, for example dichlorobenzene or resin soap.

In order to yield tints of particular purity and fastness the dyestuffs of the invention are, after the coupling, conveniently suction-filtered and heated as moist presscakes, or dried or pulverized, with organic solvents such as pyridine, dimethyl formamide, alcohol, glacial acetic acid, glycolmonoethyl ether, chlorobenzene or glycol either under reflux or under superatmospheric pressure at a raised temperature.

The dyestuffs may also be prepared in the presence of a carrier material, for example barium sulfate.

The new pigment dyestuffs are suitable for producing printing inks, colored lacquers or dispersion paints, for coloring caoutchouc, plastics or resins of natural or synthetic origin. They are convenient as well for pigment printing on a substrate, particularly on textile fibrous materials or other structures having a flat surface, for example paper. They may serve for yet other uses, for example in a finely divided form for spin-coloration of viscose rayon, cellulose ethers or esters, polyamides, polyurethanes, polyglycolterephthalates or polyacrylonitrile or for dyeing paper.

Because of their favorable rhelogical properties the new dyestuffs are easy to work in the above-mentioned media. The obtained dyeings exhibit good fastness to light, weathering and migration and are resistant to the action of chemicals, for example solvents.

In German Pat. 1,227,585 monazo dyestuffs have been proposed which are prepared with 5-acetoacetylamino benzimidazolone, however with the use of other diazo components than serve for the dyestuffs of the invention. In comparison with the known dyestuffs the dyestuffs of the present invention possess a superior fastness to light, solvents or migration beside a better resistance to heat.

The following examples illustrate the invention but are not meant to limit it thereto; the parts and percentages being by weight unless otherwise stated.

EXAMPLE 1

20.9 parts of 5-amino-isophthalic acid dimethyl ester were stirred together for about one hour with 80 parts by volume of 5 N hydrochloric acid. The solution was subsequently diluted with 300 parts by volume of water, diazotized at 10° C. with 20 parts by volume of 5-normal sodium nitrite solution, and clarified with kieselguhr. A possible excess of nitrous acid was eliminated with amidosulfonic acid.

The diazo solution was run at 20° C., with thorough stirring, into an acetic acid suspension of the coupling component prepared as follows:

24 parts of 5 - acetoacetylamino-benzimidazolone were stirred at room temperature with 200 parts by volume of water and dissolved in the presence of 60 parts by volume of 5-normal sodium hydroxide solution. The solution was clarified with charcoal and added at room temperatures dropwise in about 30 minutes, with stirring to a solution consisting of 300 parts by volume of water, 41 parts by volume of glacial acetic acid and 80 parts by volume of 5-normal sodium hydroxide solution.

The coupling reaction was instantly complete. The coupling mixture was heated to the boil, the product isolated by suction-filtration thoroughly washed with water and dried at 60°. The resulting yellow pigment was pulverized and heated for 4 hours at 130° C. with 450 parts by volume of dimethyl formamide. Then it was suction-filtered, washed with methanol until free from dimethylformamide and dried. A yellow soft-grained pigment of high tinctorial power was obtained having a pure tint. Incorporated in polyvinyl chloride, a lacquer, a printing ink or a dispersion paint it yielded yellow dyeing very fast to light, overvarnishing and bleeding in polyvinyl chloride.

In the place of dimethyl formamide there may as well be used an equal amount of pyridine or glacial acetic acid in which case the mixture was heated for 4 hours under reflux.

The incorporation into polyvinyl chloride proceeded for example according to the following method: 16.5 parts of a plasticizer mixture consisting of equal parts of dioctylphthalate and dibutylphthalate were mixed with 0.05 part of dyestuff and 0.25 part of titanium dioxide. Then 33.5 parts of polyvinyl chloride were added. The mixture was friction-rolled for 10 minutes on a double-roller mill, the formed film being continuously cut out with a spatula and rolled up. During the processing a temperature of 40° C. was maintained in one roller while the other was kept at 140°. The mixture was subsequently stripped off as a film and pressed for 5 minutes at 160° C. between two polished metal plates.

EXAMPLE 2

The coupling was performed as disclosed in Example 1, however the coupling mixture was, after completion of the reaction, adjusted to a pH value between 6.5 and 7, placed in a closed vessel and heated for 7 hours at 150° C. The product was then suction filtered, washed and dried. A yellow pigment was obtained having, practically analogous, very good fastness properties as the dyestuff of Example 1.

EXAMPLE 3

The coupling was conducted as disclosed in Example 1. After completion of the coupling reaction the dyestuff was suction-filtered and washed with water, stirred moist with 300 parts of ethyl alcohol, heated for 5 hours in a closed vessel, at 150° C., cooled, washed with water and dried. The resulting yellow pigment practically corresponded in respect to fastness to the dyestuff obtained according to Example 1.

EXAMPLE 4

20.9 parts of 5-aminoisophthalic acid dimethyl ester were diazotized as disclosed in Example 1. 24 parts of 5-acetoacetylamino benzene were dissolved according to the mentioned example and clarified with charcoal. The clarified solution was run at room temperature into a solution consisting of 300 parts by volume of water, 1.5 parts of oleylamine acetate, 41 parts by volume of glacial acetic acid and 80 parts by volume of 5-normal sodium hydroxide solution. The resulting suspension was heated to 60° C. at which temperature it was coupled with the diazo solution. The coupling reaction being terminated an aqueous solution of 5 parts of resin soap was added, the whole was heated to the boil, maintained at the boil for 2 hours, the dyestuff was suction-filtered, washed with water and dried at 60° C. A yellow pigment was obtained which, incorporated in polyvinylchloride, yielded slightly more reddish and transparent dyeing than the dyestuff corresponding to Example 1.

EXAMPLE 5

20.9 parts of 5-amino-isophthalic acid dimethyl ester were stirred for about one hour with 80 parts by volume of 5-normal hydrochloric acid and subsequently diluted with 300 parts by volume of water. The mixture was diazotized at 10° C. with 20 parts by volume of 5-normal sodium nitrite solution and clarified with kieselguhr. A possible excess of nitrous acid was removed with a small amount of amido-sulfonic acid.

The diazo solution was introduced at about 20° C. while stirring thoroughly into an acetic acid suspension of the coupling component prepared as follows:

26.1 parts of 6-chloro-5-acetoacetylamino-benzimidazolone were stirred at room temperature with 200 parts by volume of water and dissolved in the presence of 60 parts by volume of 5-normal sodium hydroxide solution. The solution was clarified with charcoal and added dropwise at room temperature, in about 30 minutes, with stirring to a solution consisting of 300 parts by volume of water, 41 parts by volume of glacial acetic acid and 80 parts by volume of 5-normal sodium hydroxide solution in 300 parts by volume of water.

The coupling was instantly complete. The coupling mixture was heated to the boil, the product separated by suction-filtration, thoroughly washed with water and dried at 60° C. The obtained yellow pigment was pulverized and heated for 4 hours at 130° C. with 450 parts by volume of dimethylformamide. The dyestuff was subsequently suction-filtered, washed with methanol until free from dimethylformamide and dried. A yellow soft-grained pigment of good tinctorial power and pure tint was obtained. Incorporated in polyvinyl chloride, a lacquer, a printing ink or a dispersion paint it yielded yellow dyeings of a good fastness to light, overvarnishing and bleeding in polyvinyl chloride.

Instead of dimethyl formamide an equivalent amount by weight of pyridine or glacial acetic acid may be used in which case the mixture was heated for 4 hours under reflux.

When in the above example isomeric 7-chloro-5-acetoacetylamino benzimidazolone or an equivalent amount of 7-bromo-5-acetoacetylamino-benzimidazolon or 6-methyl-5-acetoacetylamino-benzimidazolone, 6-methoxy-5-acetoacetylamino-benzimidazolone or 6-ethoxy-5-acetoacetylamino benzimidazolone was used instead of 6-chloro-5-acetoacetylamino benzimidazolone dyestuffs similar in shade were obtained possessing analogous fastness properties.

EXAMPLE 6

The coupling reaction was conducted as disclosed in Example 5, however, the coupling mixture was after completion of the reaction, adjusted with dilute sodium hydroxide solution to a pH of 6.5 to 7, placed in a closed vessel and heated for 7 hours at 150° C., whereupon the dyestuff was suction-filtered, washed and dried. There resulted a yellow pigment having, practically, the same outstanding fastness properties as the dyestuff of Example 5.

EXAMPLE 7

The coupling was performed as disclosed in Example 5. After completion of the coupling reaction the dyestuff was suction-filtered and washed with water. It was stirred moist with 300 parts of ethyl alcohol and heated for 5 hours at 150° C. in a closed vessel, cooled, washed with water and dried. The resulting yellow pigment practically corresponded in regard to fastness to the dyestuff prepared according to Example 5.

EXAMPLE 8

20.9 parts of 5-aminophthalic acid dimethyl ester were diazotized in accordance with Example 5. 26.1 parts of 6-chloro-5-acetoacetylamino benzimidazolone were dissolved according to the same example and clarified with charcoal. The clarified solution was introduced at room temperature into a solution of 1.5 parts of oleylamino-acetate, 41 parts by volume of glacial acetic acid and 80 parts by volume of 5-normal sodium hydroxide solution in 300 parts by volume of water. The obtained suspension was heated to 60° C. at which temperature it was coupled with the diazo solution. After completion of the coupling reaction an aqueous solution of 5 parts of resin soap was added, the whole was heated to the boil, kept for two hours at boiling temperature and the product was suction-filtered and dried at 60° C. A yellow pigment was obtained yielding in polyvinyl chloride slightly more reddish and transparent shades than the dyestuff described in Example 5.

I claim:

1. A compound of the formula

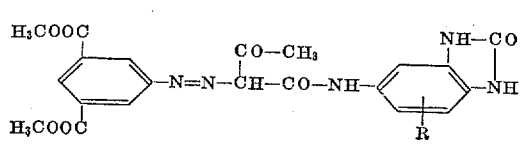

wherein R is hydrogen, chlorine or bromine, methyl, methoxy or ethoxy.

2. The compound of the formula

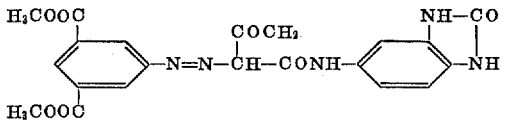

3. The compound of the formula

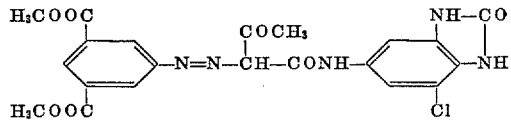

4. The compound of the formula

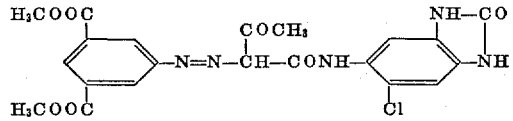

5. The compound of the formula

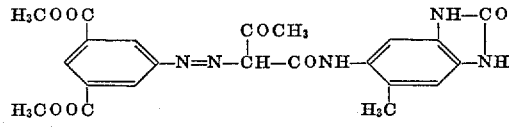

6. The compound of the formula

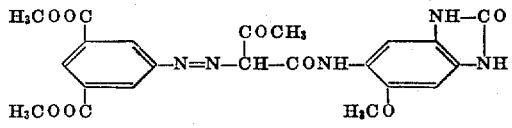

7. The compound of the formula

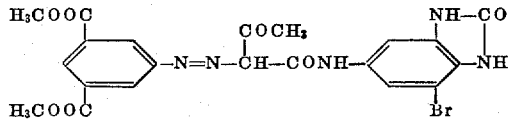

References Cited

The following references, cited by the Examiner, are of record in the patented file of this patent or the original patent.

UNITED STATES PATENTS 3,328,384 6/1967 Dietz et al. ---------- 260—157

LEWIS GOTTS, Primary Examiner

D. M. PAPUGA, Assistant Examiner

U.S. Cl. X.R.

260—37, 471; 8—4, 41, 55; 106—22, 288; 117—154